(12) United States Patent
Oakley et al.

(10) Patent No.: US 12,378,970 B2
(45) Date of Patent: *Aug. 5, 2025

(54) MASS FLOW INTERPOLATION SYSTEMS AND METHODS OF DYNAMIC COMPRESSORS

(71) Applicant: Copeland LP, Sidney, OH (US)

(72) Inventors: Michael D. Oakley, Dayton, OH (US); Michael M. Perevozchikov, Tipp City, OH (US); Matthew J. Swallow, Versailles, OH (US)

(73) Assignee: Copeland LP, Sidney, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/933,237

(22) Filed: Sep. 19, 2022

(65) Prior Publication Data

US 2023/0008611 A1 Jan. 12, 2023

Related U.S. Application Data

(63) Continuation of application No. 17/243,787, filed on Apr. 29, 2021, now Pat. No. 12,044,245.

(51) Int. Cl.
*F04D 27/00* (2006.01)
*F04D 17/12* (2006.01)
*F04D 29/30* (2006.01)

(52) U.S. Cl.
CPC .......... *F04D 27/001* (2013.01); *F04D 17/12* (2013.01); *F04D 29/30* (2013.01)

(58) Field of Classification Search
CPC .................. F02D 41/007; F02D 41/18; F02D 2041/1433; F04D 27/001; F04D 27/0246;

(Continued)

(56) References Cited

U.S. PATENT DOCUMENTS 4,586,870 A 5/1986 Hohlweg et al.
4,608,833 A 9/1986 Kountz
(Continued)

FOREIGN PATENT DOCUMENTS

GB 2024944 A * 1/1980 ............. B64D 41/00

OTHER PUBLICATIONS

NPL Interpolation; Wikipedia, "Interpolation", published Mar. 27, 2021 (Year: 2021).*

(Continued)

*Primary Examiner* — Woody A Lee, Jr.
*Assistant Examiner* — Wesley Le Fisher
(74) *Attorney, Agent, or Firm* — Armstrong Teasdale LLP

(57) ABSTRACT

A system includes a dynamic compressor to compress a working fluid and a controller. The controller is connected to the dynamic compressor and includes a processor and a memory. The memory stores a map of predetermined operating points of the dynamic compressor, each predetermined operating point including a mass flow of the compressor at that predetermined operating point. The memory stores instructions that program the processor to operate the dynamic compressor to compress the working fluid and determine a current operating point of the compressor. The instructions program the processor to calculate the mass flow for the current operating point from the map of the plurality of predetermined operating points. The instructions further program the processor to continue to operate the dynamic compressor to compress the working fluid based at least in part on the calculated mass flow for the current operating point.

18 Claims, 15 Drawing Sheets

(58) Field of Classification Search
CPC ............... F04D 27/0261; F04D 27/02; F05D 2270/101; F02B 37/24
See application file for complete search history.

(56) References Cited

U.S. PATENT DOCUMENTS

| | | | |
|---|---|---|---|
| 4,686,834 A | 8/1987 | Haley et al. | |
| 4,917,516 A | 4/1990 | Retter | |
| 5,355,691 A | 10/1994 | Sullivan et al. | |
| 5,537,830 A * | 7/1996 | Goshaw | F04D 27/0246 62/201 |
| 5,553,997 A | 9/1996 | Goshwa et al. | |
| 5,599,161 A | 2/1997 | Batson | |
| 5,669,225 A | 9/1997 | Beaverson et al. | |
| 5,791,160 A * | 8/1998 | Mandler | F25J 1/0052 62/611 |
| 6,213,724 B1 | 4/2001 | Haugen et al. | |
| 6,298,718 B1 * | 10/2001 | Wang | F02D 41/0007 701/100 |
| 6,406,268 B1 * | 6/2002 | Paice | F04D 27/0284 417/300 |
| 7,025,558 B2 | 4/2006 | Blotenberg | |
| 7,437,874 B2 * | 10/2008 | Ramamurthy | F02D 41/18 60/285 |
| 7,958,730 B2 * | 6/2011 | Stewart | F02D 23/00 123/562 |
| 8,567,207 B2 | 10/2013 | Sommer et al. | |
| 8,840,358 B2 | 9/2014 | Huis | |
| 9,175,691 B2 | 11/2015 | Stanko et al. | |
| 9,328,949 B2 | 5/2016 | Blaiklock et al. | |
| 9,677,566 B2 | 6/2017 | Sishtla | |
| 9,810,170 B2 * | 11/2017 | Petrovic | F02D 41/18 |
| 9,823,005 B2 * | 11/2017 | Clanin | F25B 49/02 |
| 10,539,353 B2 | 1/2020 | Umeda et al. | |
| 10,544,801 B2 | 1/2020 | Sishtla et al. | |
| 10,563,673 B2 | 2/2020 | Umeda et al. | |
| 10,584,651 B2 * | 3/2020 | Beno | F04D 27/02 |
| 10,612,827 B2 | 4/2020 | Sibik | |
| 11,149,654 B2 * | 10/2021 | Muthaiah | F02C 9/28 |
| 11,156,226 B2 * | 10/2021 | Sishtla | F04D 27/0253 |
| 2004/0064297 A1 | 4/2004 | Alvarez et al. | |
| 2004/0151576 A1 | 8/2004 | Blotenberg | |
| 2007/0177983 A1 | 8/2007 | Levan et al. | |
| 2010/0263391 A1 * | 10/2010 | Tetu | F04D 27/0246 62/89 |
| 2011/0038737 A1 * | 2/2011 | Conry | F04D 27/02 417/244 |
| 2013/0209218 A1 | 8/2013 | Reunanen et al. | |
| 2015/0219052 A1 | 8/2015 | Petrovic | |
| 2015/0275805 A1 * | 10/2015 | Petrovic | F02D 41/0007 701/102 |
| 2015/0377244 A1 | 12/2015 | Stanko et al. | |
| 2018/0023490 A1 * | 1/2018 | Beno | F02D 41/2422 701/102 |
| 2019/0249681 A1 * | 8/2019 | Sishtla | F04D 29/685 |

OTHER PUBLICATIONS

International Search Report and Written Opinion issued by the International Searching Authority in Application No. PCT/US2022/024727 mailed on Aug. 3, 2022, pp. 1-14.

\* cited by examiner

```
600 ─►
```

602 — Operate the dynamic compressor to compress the working fluid.

↓

604 — Determine, while operating the dynamic compressor, a current operating point of the compressor.

↓

606 — Is operating point one of a plurality of predetermined operating points of the dynamic compressor?

├─ YES → 608 — Retrieve the mass flow for the current operating point from a map of predetermined operating points stored in a memory.

└─ NO → 610 — Calculate the mass flow for the current operating point from the mass flows of a subset of the predetermined operating points nearest the current operating point.

FIG. 6

MASS FLOW INTERPOLATION SYSTEMS AND METHODS OF DYNAMIC COMPRESSORS

CROSS-REFERENCE TO RELATED APPLICATIONS

This application is a continuation of U.S. patent application Ser. No. 17/243,787, filed on Apr. 29, 2021, the disclosure of which is hereby incorporated by reference in its entirety.

FIELD

The field of the disclosure relates generally to control systems, and more particularly, to control systems for machines including dynamic compressors.

BACKGROUND

Dynamic compressors, including centrifugal compressors, are commonly used in HVAC systems. The compressor is operatively connected to a motor via a driveshaft that supports multiple compression mechanisms or impeller stages. The motor rotates the impeller at a rotational speed and loading condition to compress the refrigerant to a specified demand. The motor speed and load can be controlled to operate the compressor under a wide range of operating conditions. Knowledge of the precise operating point of the compressor can help avoid operating in regions of inefficiency (e.g., choked flow) or instability (e.g., surge).

Choked flow occurs when the compressor load at a particular speed is sufficiently low that the working fluid achieves minimal pressure rise through the machine. While a compressor can safely run at choke for an extended period of time, it is an inefficient and undesirable mode of operation. Surge is a highly unstable flow regime that occurs when the head developed by the compressor is insufficient to overcome the pressure at the compressor discharge, resulting in flow reversal through the impeller. Operating for even a short time in this unstable flow regime can damage bearings and other parts of the machine, thereby reducing the service life of the compressor.

To avoid operating in an undesirable flow regime, it is desirable to have real-time data on the key parameters that define a compressor's operating point: rotational speed, pressure rise, and mass flow rate. By including these parameters in the compressor's control strategy, other operating parameters may be adjusted to ensure that the compressor stays within a particular operating range. Motor speed and pressures at the compressor inlet and exit are easily measured using standard instrumentation. However, sensors that measure mass flow rate are often cost-prohibitive. Thus, it is desirable to determine a compressor's mass flow rate without the cost of additional instrumentation.

This background section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

SUMMARY

One aspect of the present disclosure is directed to a system comprising a dynamic compressor operable to compress a working fluid and a controller. The controller is connected to the dynamic compressor and comprises a processor and a memory. The memory stores a map of predetermined operating points of the dynamic compressor, with each predetermined operating point including a mass flow of the dynamic compressor at that predetermined operating point. The memory further stores instructions that program the processor to operate the dynamic compressor to compress the working fluid and determine a current operating point of the compressor while operating the dynamic compressor. The instructions stored in the memory program the processor to calculate the mass flow for the current operating point from the map of the plurality of predetermined operating points. The instructions stored in the memory further program the processor to continue to operate the dynamic compressor to compress the working fluid based at least in part on the calculated mass flow for the current operating point.

Another aspect of the present disclosure is directed to a controller for a dynamic compressor without a mass flow sensor. The controller comprises a processor and a memory. The memory stores a map of a plurality of predetermined operating points of the dynamic compressor, with each predetermined operating point including a mass flow of the dynamic compressor at that predetermined operating point. The memory further stores instructions that program the processor to operate the dynamic compressor to compress the working fluid and determine a current operating point of the compressor while operating the dynamic compressor. The instructions stored in the memory program the processor to calculate the mass flow for the current operating point from the map of the plurality of predetermined operating points. The instructions stored in the memory further program the processor to continue to operate the dynamic compressor to compress the working fluid based at least in part on the calculated mass flow for the current operating point.

Another aspect of the present disclosure is directed to a method of determining a mass flow of a dynamic compressor that is compressing a working fluid and does not include a mass sensor. The method includes operating the dynamic compressor to compress the working fluid, determining a current operating point of the compressor, calculating the mass flow for the current operating point from a map of a plurality of predetermined operating points, with each predetermined operating point in the map including a mass flow of the dynamic compressor at that predetermined operating point, and continuing to operate the dynamic compressor to compress the working fluid based at least in part on the calculated mass flow for the current operating point.

Various refinements exist of the features noted in relation to the above-mentioned aspects. Further features may also be incorporated in the above-mentioned aspects. These refinements and additional features may exist individually or in any combination. For instance, various features discussed below in relation to any of the illustrated embodiments may be incorporated into any of the above-described aspects, alone or in any combination.

BRIEF DESCRIPTION OF THE DRAWINGS

The following figures illustrate various aspects of the disclosure.

FIG. 6 is a flow chart of a method of determining a mass flow of a dynamic compressor that is compressing a working fluid;

Corresponding reference characters indicate corresponding parts throughout the drawings.

DETAILED DESCRIPTION

For conciseness, examples will be described with respect to a centrifugal compressor. However, the methods and systems described herein may be applied to any suitable dynamic compressor. The performance and longevity of a dynamic compressor can be improved with real-time measurements of key operating parameters including speed, pressure ratio, and inlet mass flow rate. Such measurements can be used as inputs in a control algorithm to limit the likelihood of the compressor slipping into undesirable operating conditions like surge or choke. To obtain mass flow information during operation without the expense of additional instrumentation, a set of prior data points can be used to interpolate the value of mass flow at the current operating point. The prior data points may be obtained from simulations, experiments, a combination of the two, or any other suitable means.

Figure 1:
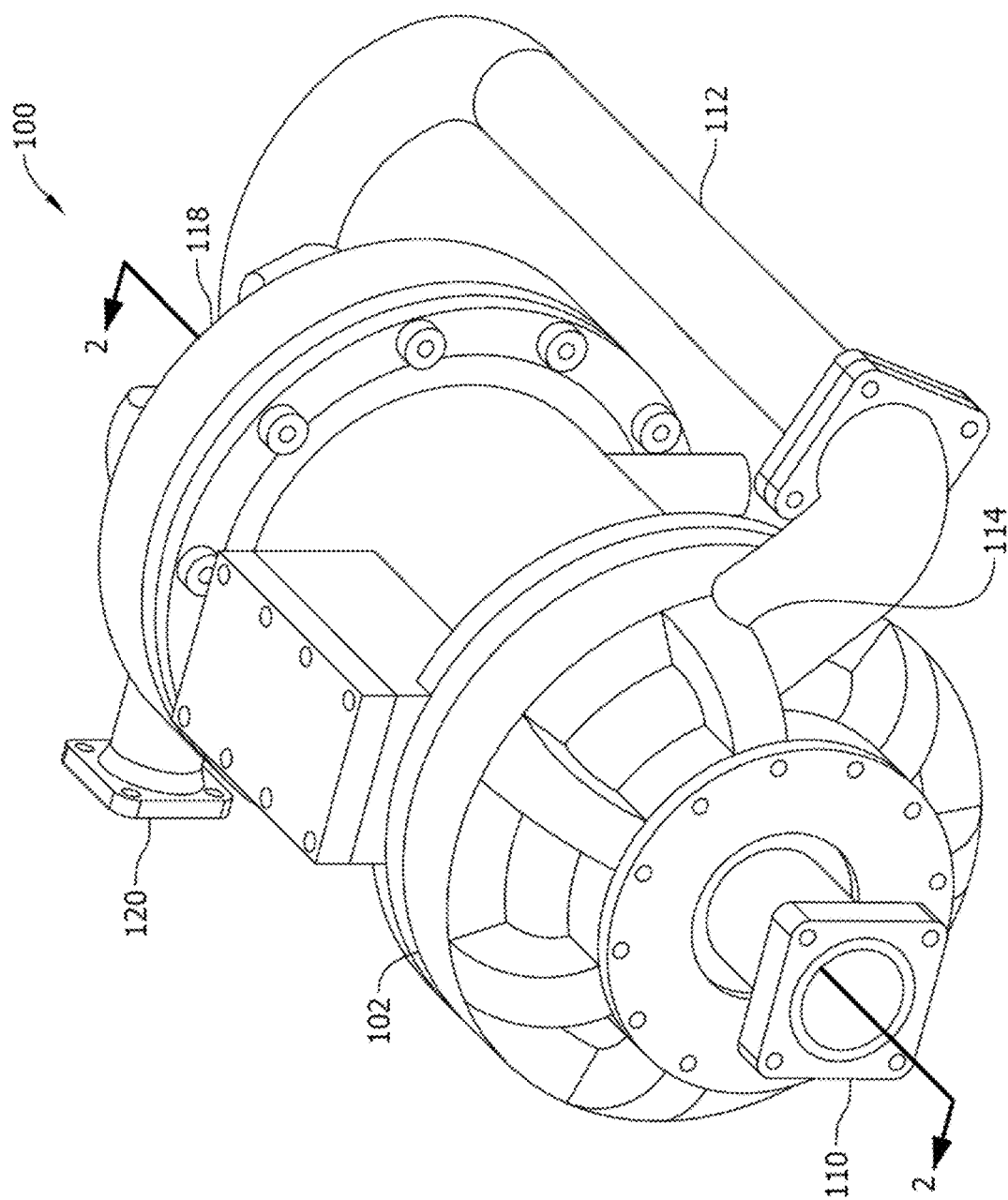
FIG. 1 is a perspective view of an assembled dynamic compressor.

Referring to FIG. 1, a two-stage refrigerant compressor is indicated generally at 100. The compressor 100 includes a compressor housing 102 that forms at least one sealed cavity within which each stage of refrigerant compression is accomplished. The compressor 100 includes a first refrigerant inlet 110 to introduce refrigerant vapor into the first compression stage (not labeled in FIG. 1), a first refrigerant exit 114, a refrigerant transfer conduit 112 to transfer compressed refrigerant from the first compression stage to the second compression stage, a second refrigerant inlet 118 to introduce refrigerant vapor into the second compression stage (not labeled in FIG. 1), and a second refrigerant exit 120. The refrigerant transfer conduit 112 is operatively connected at opposite ends to the first refrigerant exit 114 and the second refrigerant inlet 118, respectively. The second refrigerant exit 120 delivers compressed refrigerant from the second compression stage to a cooling system in which compressor 100 is incorporated.

Figure 2:
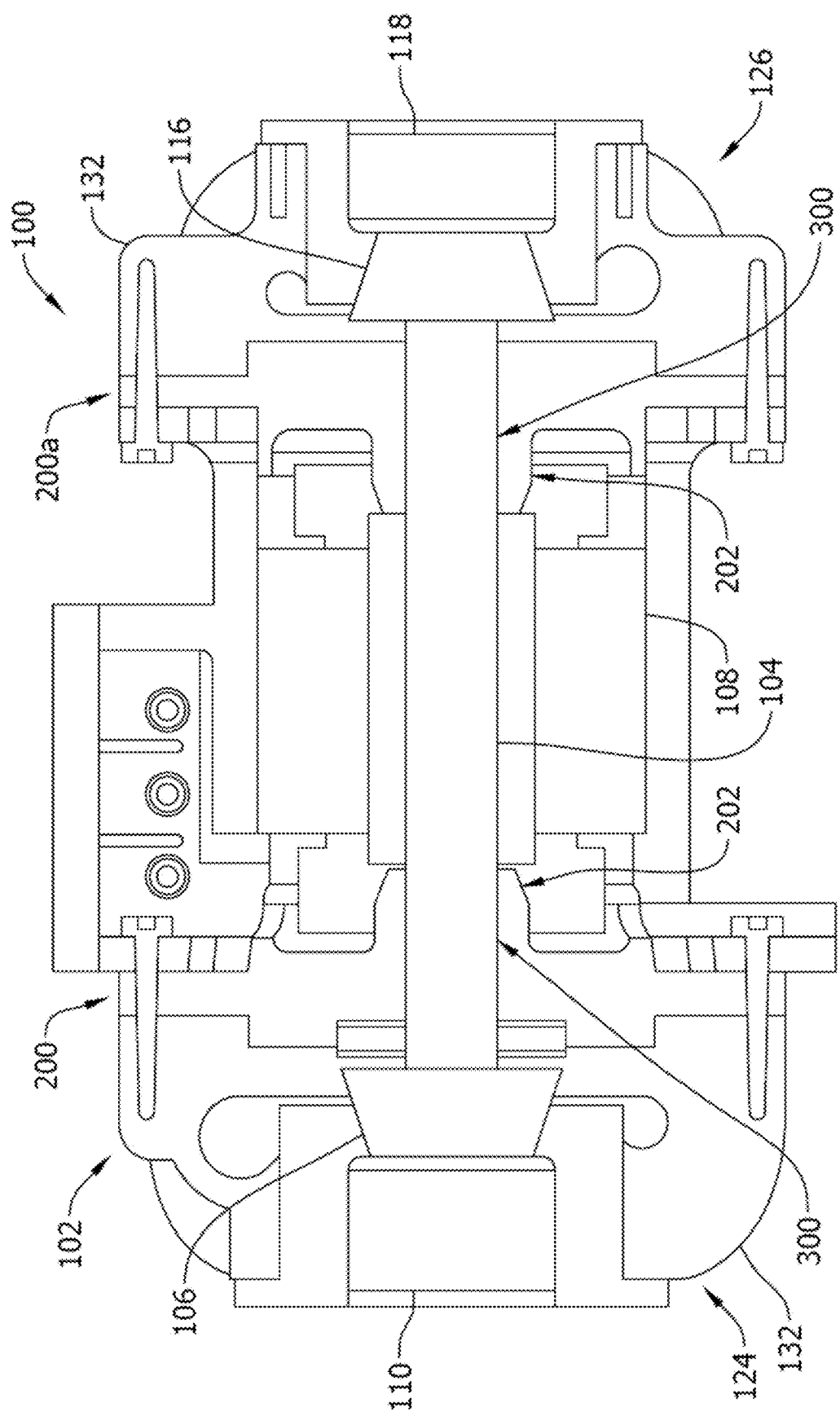
FIG. 2 is a cross-sectional view of the compressor of FIG. 1 taken along line 2-2, with the external conduit removed.

Referring to FIG. 2, the compressor housing 102 encloses a first compression stage 124 and a second compression stage 126 at opposite ends of the compressor 100. The first compression stage 124 includes a first compression mechanism 106 configured to add kinetic energy to refrigerant entering via the first refrigerant inlet 110. In some embodiments, the first compression mechanism 106 is an impeller. The kinetic energy imparted to the refrigerant by the first compression mechanism 106 is converted to increased refrigerant pressure as the refrigerant velocity is slowed upon transfer to a sealed cavity (e.g., a diffuser) formed within the volute 132. Similarly, the second compression stage 126 includes a second compression mechanism 116 configured to add kinetic energy to refrigerant transferred from the first compression stage 124 entering via the second refrigerant inlet 118. In some embodiments, the second compression mechanism 116 is an impeller. The kinetic energy imparted to the refrigerant by the second compression mechanism 116 is converted to increased refrigerant pressure as the refrigerant velocity is slowed upon transfer to a sealed cavity (e.g., a diffuser) formed within the volute 132. Compressed refrigerant exits the second compression stage 126 via the second refrigerant exit 120 (not shown in FIG. 2).

The first stage compression mechanism 106 and second stage compression mechanism 116 are connected at opposite ends of a driveshaft 104. The driveshaft 104 is operatively connected to a motor 108 positioned between the first stage compression mechanism 106 and second stage compression mechanism 116 such that the first stage compression mechanism 106 and second stage compression mechanism 116 are rotated at a rotation speed selected to compress the refrigerant to a pre-selected pressure exiting the second refrigerant exit 120 (not shown in FIG. 2). Any suitable motor may be incorporated into the compressor 100 including, but not limited to, an electrical motor.

The driveshaft 104 is supported by gas foil bearing assemblies 300 positioned within a sleeve 202 of each bearing housing 200/200a. Each bearing housing 200/200a includes a mounting structure (not shown) for connecting the respective bearing housing 200/200a to the compressor housing 102, as illustrated in FIG. 2. The bearing housings 200/200a may further serve as a mounting structure for a variety of elements including, but not limited to, radial bearings, such as the gas foil bearing assembly 300 described above, a thrust bearing, and sensing devices (not shown) used as feedback for passive or active control schemes such as proximity probes, pressure transducers, thermocouples, key phasers, and the like.

Figure 3:
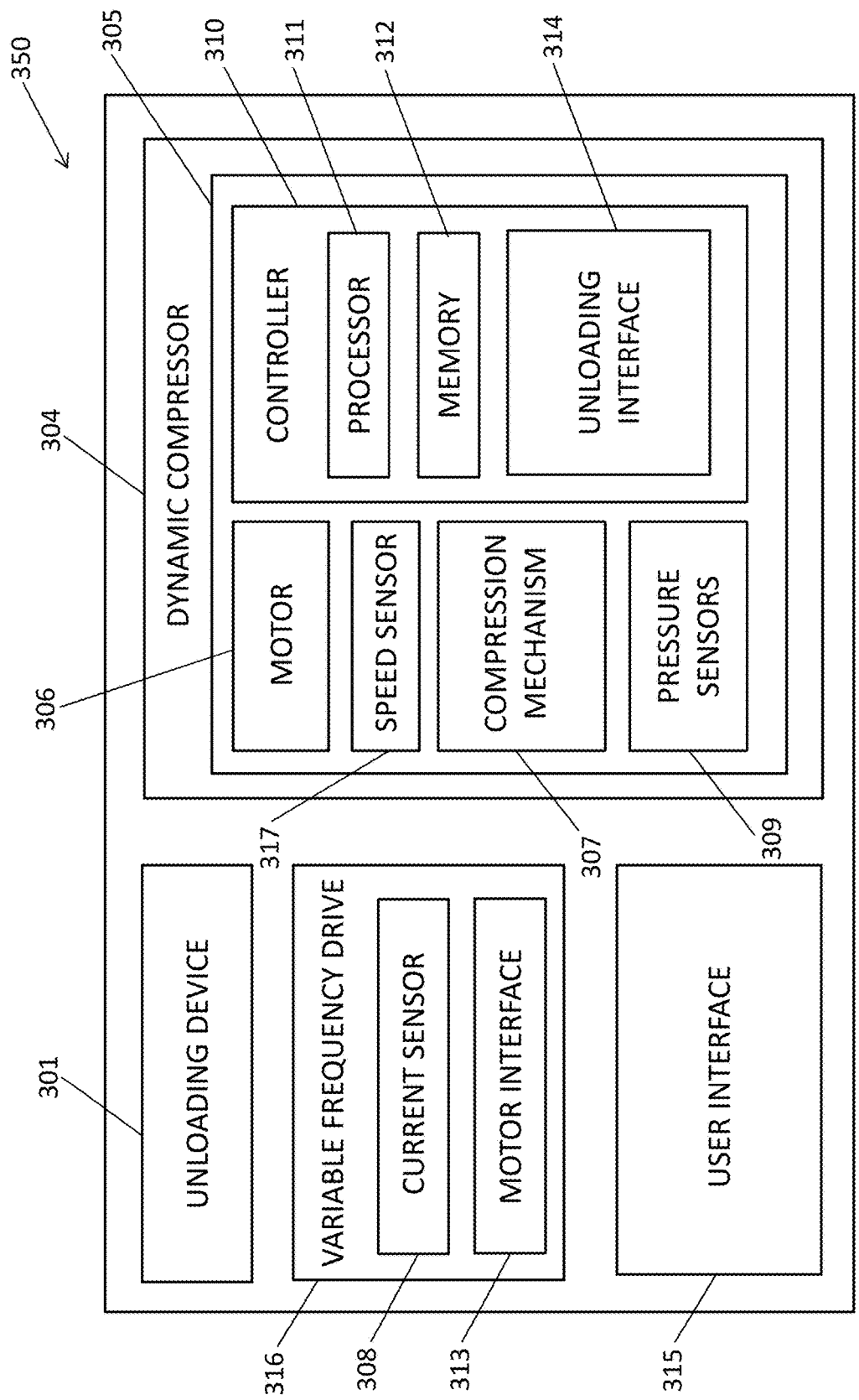
FIG. 3 is a block diagram of a control system for a dynamic compressor.

Referring to FIG. 3, an example embodiment of a system 350 includes a dynamic compressor 304 operable to compress a working fluid. The compressor 304 includes a compressor housing 305, a compression mechanism 307, a motor 306, a speed sensor 317, pressure sensors 309 and a controller 310. In the present embodiment, the dynamic compressor 304 is a centrifugal compressor, and the compression mechanism 307 is an impeller. In other embodiments, the dynamic compressor 304 may be an axial compressor, and the compression mechanism 307 may be an axial rotor. The speed sensor 317 measures the rotational speed of the compressor, and the pressure sensors 309 measure pressure at various points along the compressor flow path, including at the refrigerant inlet and the refrigerant exit. Additional sensors may be installed in the compressor 304 to provide data on its operation, including but not limited to temperature sensors, flow sensors, current sensors 308, voltage sensors, rotational rate sensors, and any other suitable sensors. The compressor 304 is not limited to a specific construction in the system 350, and may be constructed similarly to the compressor 100 described in FIGS. 1-2 or may be constructed in a different manner. The system 350 further includes an unloading device 301, a variable frequency drive 316, and a user interface 315.

A controller 310 is operatively connected to the compressor 304 to control its operation, based in part on the measured parameters described above. The controller 310 includes a processor 311, a memory 312, and an unloading interface 314. The memory 312 stores a map 500 (FIG. 5) of a plurality of operating points of the compressor 304 which can be stored in any suitable data structure, such as a table, a matrix, and the like. The memory 312 additionally stores instructions that are executed by the processor 311 to operate the compressor 304 to compress the working fluid and to perform the methods of mass flow interpretation. The map 500 and method of mass flow interpolation are discussed in more detail further below.

The system 350 includes an interface for connection of the controller 310 to the VFD 316 and a motor interface 313 for connection of the VFD 316 to the motor 306. In certain embodiments, the VFD 316 operates under the control of the controller 310. In further embodiments, the VFD 316 is a part of the controller 310. The system 350 further includes an unloading interface 314 for connection of the controller 310 to the unloading device 301.

The controller 310 is operatively coupled to the unloading device 301 through the unloading interface 314, which removes and/or reduces the load on the compressor 304 during start-up and shut-down routines and detected surge events to limit severity of surge events. In the example embodiment, the unloading device 301 is a variable diffuser or variable inlet guide vanes (VIGV). The controller 310 is configured to control at least one operating parameter of the unloading device 301, such as a position of the VIGV. In other embodiments, the unloading device 301 is a bypass valve. Bypass valves, such as refrigerant bypass valves, provide an alternative path for the gas, thereby stopping the pressure rise of the compressor 304 and limiting any potential surging, no matter how slowly the compressor motor 306 is accelerating during start-up or decelerating during shut-down. In other embodiments, the unloading device 301 is an expansion valve. In still other embodiments, the unloading device 301 may be a variable orifice or diameter valve, such as a servo valve, and a fixed orifice or diameter valve, such as a solenoid valve or a pulse-width-modulated (PWM) valve configured to control opening and closing according to a duty cycle. Although many types of unloading devices are described here, the unloading device 301 may be any suitable device, or combination of devices, that reduce the load on the compressor 304.

The system 350 further includes a user interface 315 configured to output (e.g., display) and/or receive information (e.g., from a user) associated with the system 350. In some embodiments, the user interface 315 is configured to receive an activation and/or deactivation input from a user to activate and deactivate (i.e., turn on and off) or otherwise enable operation of the system 350. Moreover, in some embodiments, the user interface 315 is configured to output information associated with one or more operational characteristics of the system 350, including, for example and without limitation, warning indicators such as severity alerts, occurrence alerts, fault alerts, motor speed alerts, and any other suitable information.

The user interface 315 may include any suitable input devices and output devices that enable the user interface 315 to function as described herein. For example, the user interface 315 may include input devices including, but not limited to, a keyboard, mouse, touchscreen, joystick(s), throttle(s), buttons, switches, and/or other input devices. Moreover, the user interface 315 may include output devices including, for example and without limitation, a display (e.g., a liquid crystal display (LCD) or an organic light emitting diode (OLED) display), speakers, indicator lights, instruments, and/or other output devices. Furthermore, the user interface 315 may be part of a different component, such as a system controller (not shown). Other embodiments do not include a user interface 315.

The controller 310 is generally configured to control operation of the compressor 304. The controller 310 controls operation through programming and instructions from another device or controller or is integrated with the system 350 through a system controller. In some embodiments, for example, the controller 310 receives user input from the user interface 315, and controls one or more components of the system 350 in response to such user inputs. For example, the controller 310 may control the motor 306 based on user input received from the user interface 315. In some embodiments, the system 350 may be controlled by a remote control interface. For example, the system 350 may include a communication interface (not shown) configured for connection to a wireless control interface that enables remote control and activation of the system 350. The wireless control interface may be embodied on a portable computing device, such as a tablet or smartphone.

The controller 310 may generally include any suitable computer and/or other processing unit, including any suitable combination of computers, processing units and/or the like that may be communicatively coupled to one another and that may be operated independently or in connection within one another (e.g., controller 310 may form all or part of a controller network). Controller 310 may include one or more modules or devices, one or more of which is enclosed within system 350, or may be located remote from system 350. The controller 310 may be part of compressor 304 or separate and may be part of a system controller in an HVAC system. Controller 310 and/or components of controller 310 may be integrated or incorporated within other components of system 350. The controller 310 may include one or more processor(s) 311 and associated memory device(s) 312 configured to perform a variety of computer-implemented functions (e.g., performing the calculations, determinations, and functions disclosed herein). As used herein, the term "processor" refers not only to integrated circuits, but also to a controller, a microcontroller, a microcomputer, a programmable logic controller (PLC), an application-specific integrated circuit, and other programmable circuits. Additionally, memory device(s) 312 of controller 310 may generally be or include memory element(s) including, but not limited to, computer readable medium (e.g., random access memory (RAM)), computer readable non-volatile medium (e.g., a flash memory), a floppy disk, a compact disc-read only memory (CD-ROM), a magneto-optical disk (MOD), a digital versatile disc (DVD) and/or other suitable memory elements. Such memory device(s) 312 may generally be configured to store suitable computer-readable instructions that, when implemented by the processor(s) 311, configure or cause controller 310 to perform various functions described herein including, but not limited to, controlling the system 350, controlling operation of the motor 306, receiving inputs from user interface 315, providing output to an operator via user interface 315, controlling the unloading device 301 and/or various other suitable computer-implemented functions.

Figure 4:
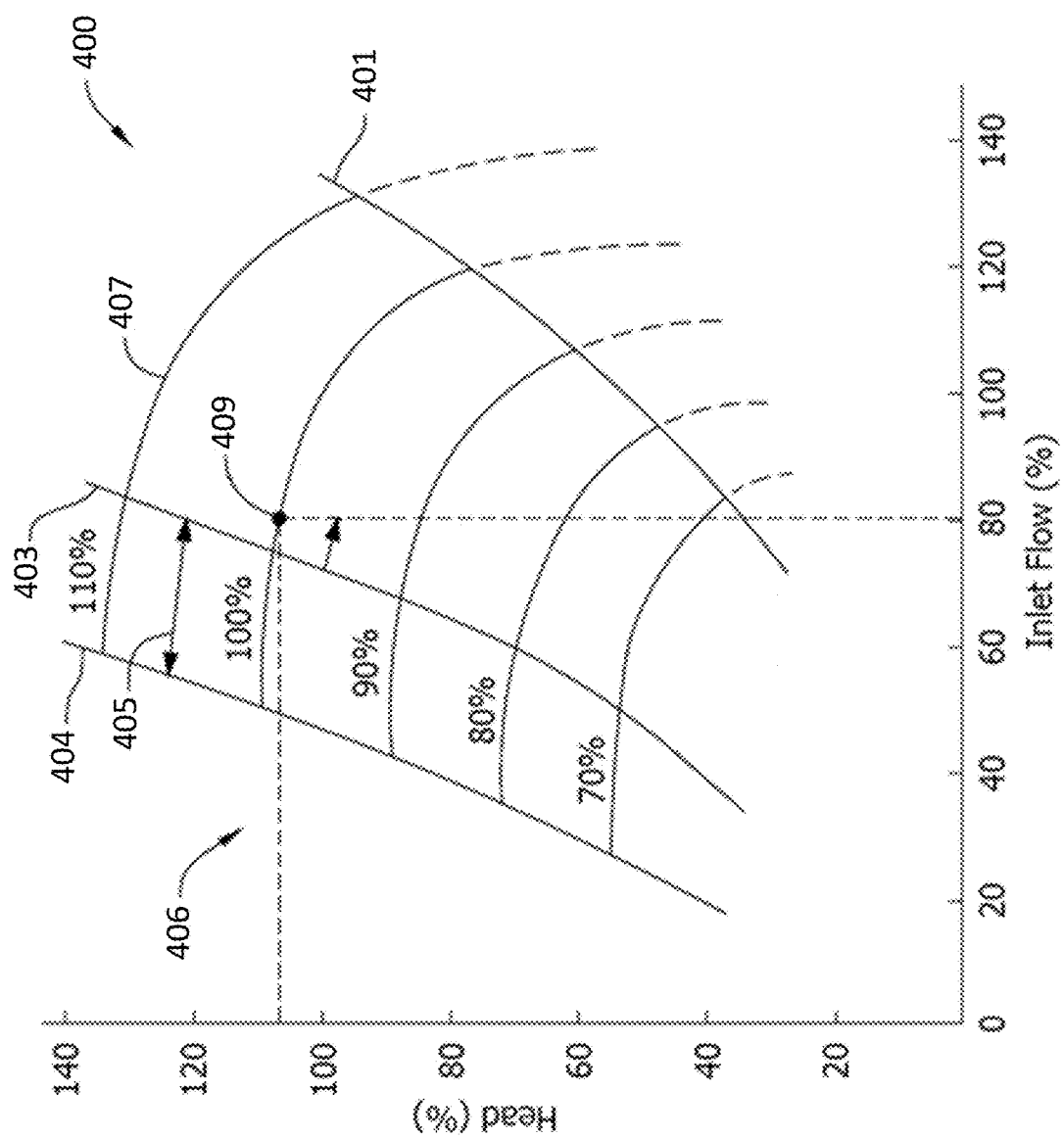
FIG. 4 is an operating map of a dynamic compressor.

Referring to FIG. 4, an operating envelope or operating map 400 of an example dynamic centrifugal compressor 304 is shown. This operating map 400 is one graphical representation of the map of a plurality of predetermined operating points stored by the memory 312. The operating map 400 graphically displays a compressor's performance in terms of flows, heads, and speeds. The map shows head vs. inlet mass flow rate as a percentage of their values at the design point of the compressor 304. The head is a total pressure ratio of exit pressure to inlet pressure. Inlet mass flow rate is a measure of the amount of a working fluid, such as a refrigerant, flowing through the compression mechanism 307. The operating map 400 shows a plurality of compressor speed lines 407. In this example, there are five speed lines 407 that range from 70% design speed to 110% design speed, with each line separated by a 10% difference. Although these particular speed lines are shown in this example, any number of speed lines at any different percentages of the compressor design speed may be shown for any type of compressor.

A surge limit line 404 indicates the maximum loading condition before surge occurs in the surge region 406 (i.e., to the left of surge limit line 404). A surge control line 403 roughly indicates the maximum loading condition under which the compressor 304 can safely operate without risk of slipping into surge. The surge control line 403 is defined by a surge margin 405 from the surge limit line 404. By operating to the right of the surge control line 403, the compressor should avoid surging. The choke line 401 indicates that operation to its right will result in the compressor operating in choke condition. An operating point 409 of the operating map 400 for the compressor 304 is shown as the intersection of a speed line, inlet mass flow rate, and total pressure ratio. For example, the operating point 409 shown in operating map 400 is at 80% inlet mass flow rate, 108% head, and 100% speed, though any number of operating points may be shown for any type of compressor. The operating point defines the current operating parameters of the compressor, and the operating map 400 indicates how close the current operating point is to operating in an unstable condition (i.e. surge) or an inefficient condition (i.e. choke).

Figure 5:
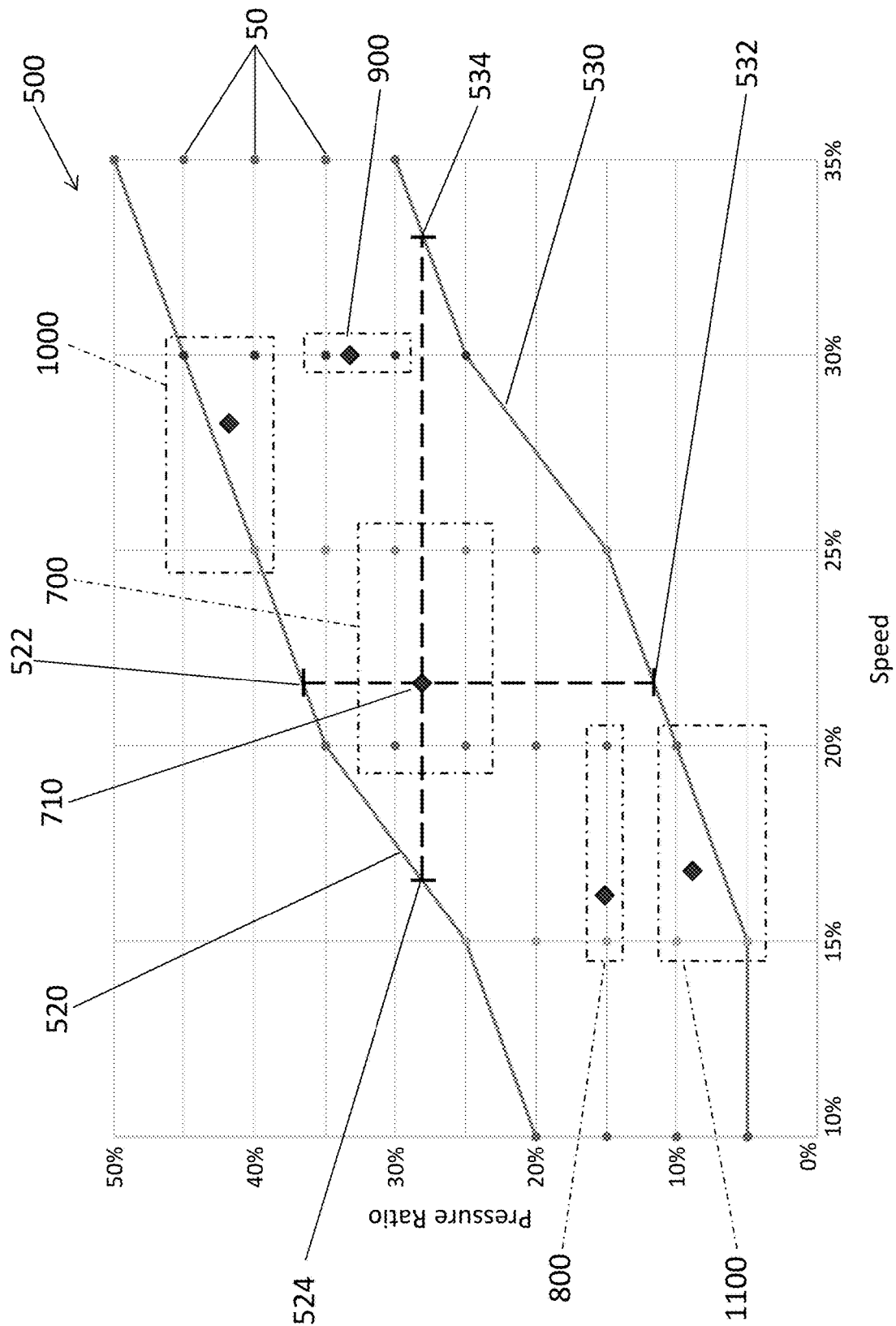
FIG. 5 is a map of predetermined operating points and example current operating points of a dynamic compressor.

FIG. 5 shows a map 500 of predetermined operating points 50. The map 500 is another representative illustration of the map of predetermined operating points stored in the memory 312. Each predetermined operating point 50 is shown as the intersection of a compressor speed value and a compressor pressure ratio value. All of the predetermined operating points in the map 500 have the same VIGV position. Similar maps are stored in the memory 312 for different VIGV positions and may include predetermined operating points for the same combinations of speed and pressure ratio as the map 500. An inlet mass flow rate is defined for each predetermined operating point 50. A speed at surge (522) and choke (532) and a pressure ratio at surge (524) and choke (534) are also defined for each predetermined operating point 50. The map 500 includes operating points 50 in a range up to and including points along the surge line 520 and the choke line 530. The memory 312 stores a surge point mass flow for each predetermined surge point and a choke point mass flow for every predetermined choke point. The map 500 does not include any points above the surge line 520 or below the choke line 530, because points above the surge line 520 or below the choke line 530 are to be avoided and are thus not "operating points." In other embodiments, the inlet mass flow rate of points above the surge line 520 or below the choke line 530 may be included. In this map 500, the predetermined operating points 50 range between 10% and 35% speed, and between 5% pressure ratio and 50% pressure ratio, with each point separated by 5% on both axes. Although these particular operating points are shown in this example, any number of operating points at any values and with any resolution may be shown for any type of compressor. The speed, pressure ratio, inlet mass flow rate, and VIGV position values of each predetermined operating point 50 may be generated by simulating operation of the dynamic compressor on a computer, testing the dynamic compressor in a controlled environment, a combination of simulation and testing, or by any other suitable method for predetermining the speed, pressure ratio, inlet mass flow rate, and VIGV position values of each predetermined operating point 50.

The memory 312 additionally stores instructions that program the processor 311 to determine the mass flow of the compressor, a method 600 of which is shown in FIG. 6. While operating 602 the dynamic compressor to compress the working fluid, the processor 311 determines 604 a current operating point of the compressor 304. The current operating point is defined by the measured speed, pressure ratio, and VIGV position at which the compressor 304 is operating at a given time. For example, a current operating point 710 shown in map 500 represents current operation at 22% speed, 28% pressure ratio, and a VIGV position that is the VIGV position of all of the points in the map 500. If the current operating point has the same values of speed, pressure ratio, and VIGV position as one of the predetermined operating points 50, the processor will determine 606 that the current operating point is one of the predetermined operating points 50. In such a case, the memory 312 stores instructions that program the processor 311 to retrieve 608 the value of the inlet mass flow rate for that predetermined operating point 50 and return it as the value of inlet mass flow rate at the current operating point.

If the current operating point does not have the same speed, pressure ratio, and VIGV position as any of the predetermined operating points 50, the processor will determine 606 that the current operating point is not one of the predetermined operating points 50. In such cases, the memory 312 includes instructions that program the processor 311 to determine a subset of predetermined operating points 50 nearest the current operating point. The processor 311 then performs a linear or envelope interpolation to calculate 610 the mass flow at the current operating point from the mass flow values of the subset of the predetermined operating points 50 nearest the current operating point. The procedure of determining the points that comprise the subset and performing the envelope interpolation is discussed in detail below.

Figure 7A:
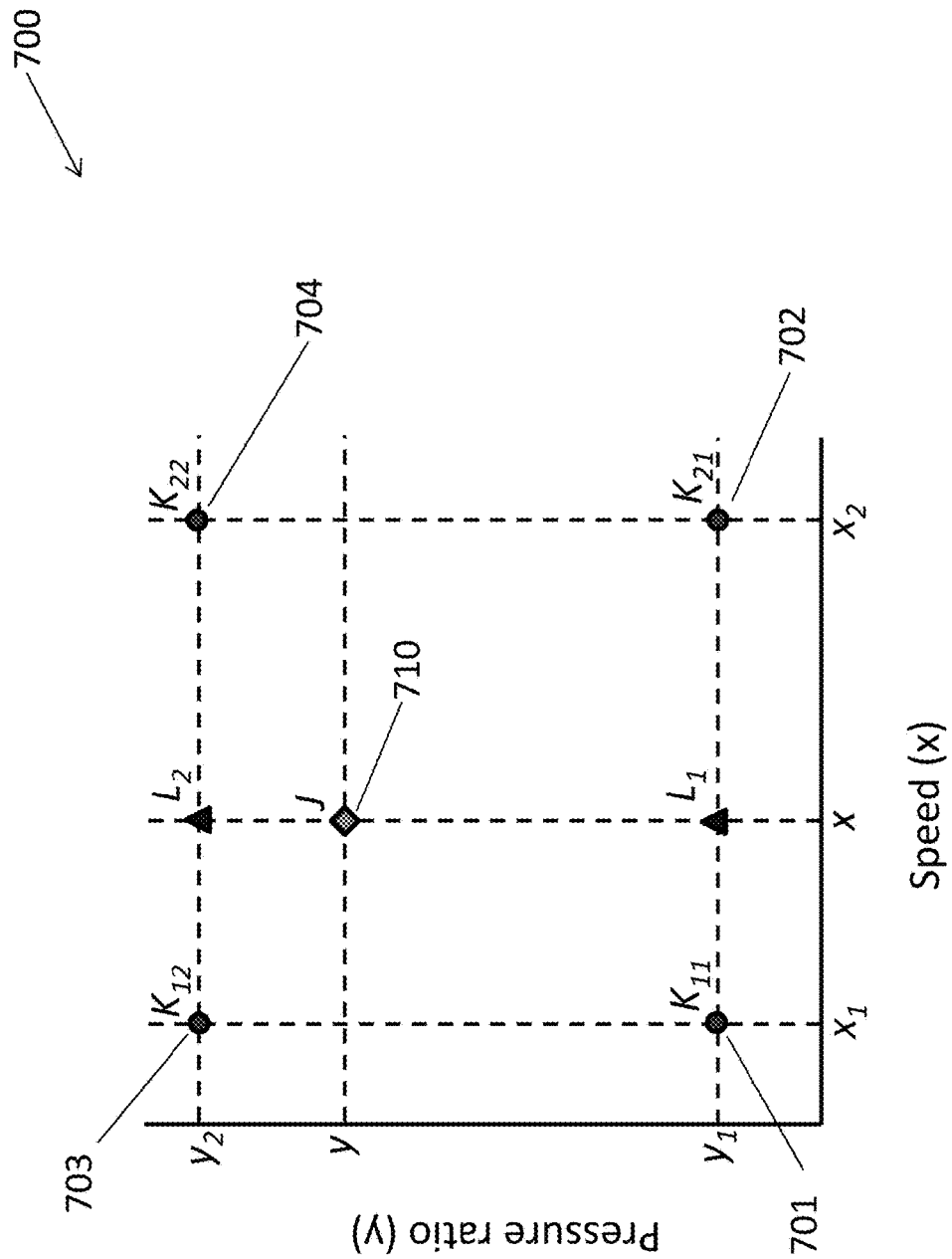
FIG. 7A is a first graphical representation of a current operating point and a subset of the nearest predetermined operating points.

The envelope interpolation will be explained with reference to FIG. 7A. FIG. 7A is a first graphical representation of a current operating point 710 and a subset 700 of the predetermined operating points 701, 702, 703, 704 nearest the current operating point 710. The current operating point 710 does not have the same speed or pressure ratio values as any of the predetermined operating points 701-704, and it is not adjacent to the surge line 520 or the choke line 530. Thus, the instructions stored in the memory 312 program the processor 311 to form the subset 700 by identifying the four predetermined operating points that are closest to the current operating point 710. The subset 700 includes four predetermined points 701-704 shown at the coordinates $(x_1, y_1)$, $(x_2, y_1)$, $(x_1, y_2)$, and $(x_2, y_2)$, where x is the compressor speed and y is the compressor pressure ratio at that operating point. Each of the four predetermined points 701-704 is additionally labeled with its inlet mass flow rate, shown as $K_{11}$, $K_{21}$, $K_{12}$, and $K_{22}$, respectively. In further embodiments, the subset may comprise fewer than four predetermined operating points.

The mass flow J at the current operating point 710 is calculated using a process of envelope interpolation. A first interim mass flow $L_1$, defined at the same speed as the current operating point 710, is calculated as the sum of a mass flow $K_{11}$ of a first predetermined operating point 701 and the difference between the mass flows at the second and first predetermined operating points 702, 701 $(K_{21}-K_{11})$ scaled by the ratio of the difference between the speeds at the current operating point 710 and the first predetermined operating point 701 $(x-x_1)$ and the difference between the speeds at the second predetermined operating point 702 and the first predetermined operating point 701 $(x_2-x_1)$. Thus, $L_1$ is determined as:

$$L_1 = K_{11} + \frac{(x-x_1)}{(x_2-x_1)} *(K_{21} - K_{11}) \quad (1)$$

In other embodiments, the calculation of the first interim mass flow $L_1$ may be calculated from any other predetermined points using similar calculations.

Similarly, a second interim mass flow $L_2$, defined at the same speed as the current operating point 710, is calculated as the sum of a mass flow $K_{12}$ of a third predetermined operating point 703 and the difference between the mass flows at the third and fourth predetermined operating points 703, 704 $(K_{22}-K_{12})$ scaled by the ratio of the difference between the speeds at the current operating point 710 and the third predetermined operating point 703 $(x-x_1)$ and the difference between the speeds at the fourth predetermined operating point 704 and the third predetermined operating point 703 $(x_2-x_1)$. Thus, $L_2$ is determined as:

$$L_2 = K_{12} + \frac{(x-x_1)}{(x_2-x_1)} *(K_{22} - K_{12}) \quad (2)$$

In other embodiments, the calculation of the second interim mass flow $L_2$ may be calculated from any other predetermined points using similar calculations.

Finally, the mass flow J may be calculated as the sum of the first interim mass flow $L_1$ and the difference between the second and first interim mass flows (L2–L1) scaled by the ratio of the difference between the pressure ratio at the current operating point 710 and the pressure ratio at the first and second predetermined operating point (y–y1) and the difference between the pressure ratio at the third and fourth predetermined operating point 703, 704 and the pressure ratio the first and second predetermined operating point 701, 702 $(y_2-y_1)$. Thus, J is determined as:

$$J = L_1 + \frac{(y-y_1)}{(y_2-y_1)} *(L_2 - L_1) \quad (3)$$

In other embodiments, the mass flow J may be calculated from second interim mass flow L2 using similar equations.

Figure 7B:
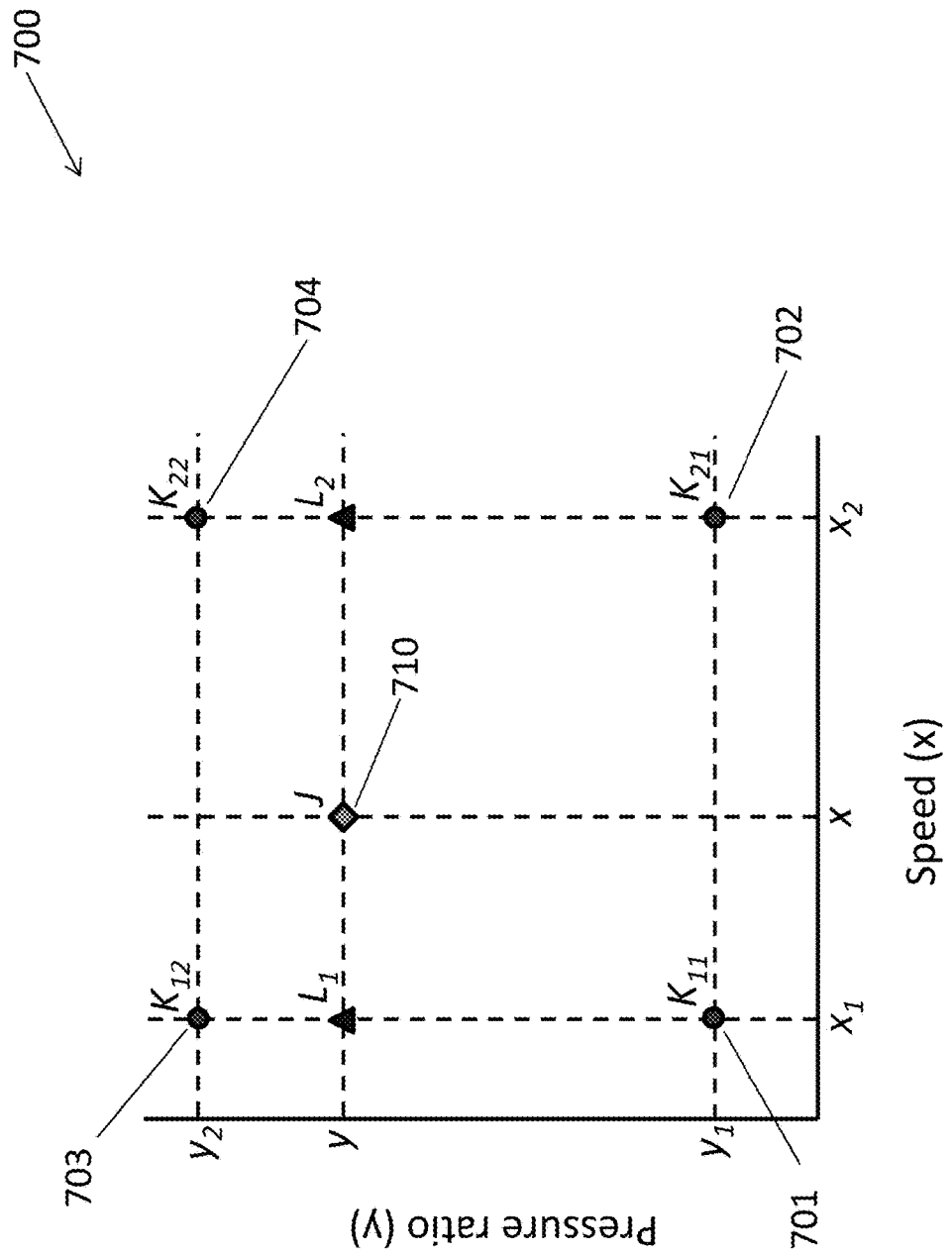
FIG. 7B is a second graphical representation of a current operating point and a subset of the nearest predetermined operating points.

FIG. 7B shows a second graphical representation of the current operating point 710 and the subset 700 of the nearest predetermined operating points 701-704. The envelope interpolation process described above may alternatively be performed by defining the first and second interim mass flow values $L_1$, $L_2$ at the same pressure ratio as the current operating point 710, rather than at the same speed. In such a case, the calculation of the interim mass flow values $L_1$, $L_2$ will use a ratio of pressure ratio differences as a scaling factor. Thus, $L_1$ is determined as:

$$L_1 = K_{11} + \frac{(y-y_1)}{(y_2-y_1)} *(K_{12} - K_{11}) \quad (4)$$

In other embodiments, the calculation of the first interim mass flow L may be determined from any other predetermined points using similar calculations.

Similarly, $L_2$ is determined as:

$$L_2 = K_{21} + \frac{(y-y_1)}{(y_2-y_1)} *(K_{22} - K_{21}) \quad (5)$$

In other embodiments, $L_2$ may be determined may from any other predetermined points using similar calculations. The calculation of the mass flow J at the current operating point 710 will use a ratio of speed differences as a scaling factor. Thus, J is determined as:

$$J = L_1 + \frac{(x-x_1)}{(x_2-x_1)} *(L_2 - L_1) \quad (6)$$

In other embodiments, J may be calculated from second interim mass flow L2 using similar equations.

Figure 8:
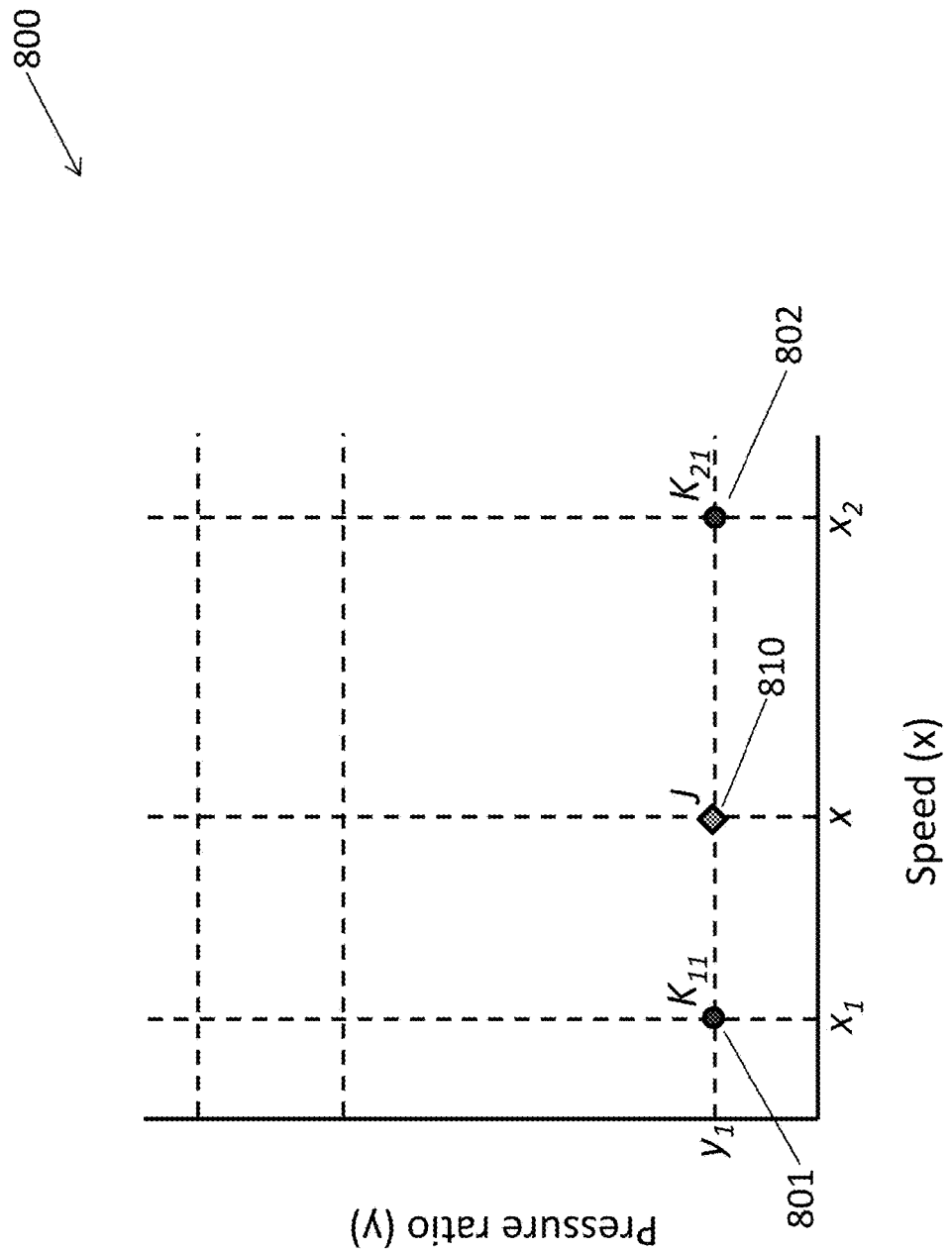
FIG. 8 is a third graphical representation of a current operating point and a subset of the nearest predetermined operating points.

FIG. 8 shows a third graphical representation of a current operating point 810 and a subset 800 of the predetermined operating points nearest the current operating point 810. The current operating point 810 has the same pressure ratio value $y_1$ as the two nearest predetermined operating points 801, 802 but a different speed value x, and it is not adjacent to the surge line 520 or the choke line 530. Thus, the subset of nearest points 800 is formed from the two nearest points having the same pressure ratio value; for example, those shown at coordinates $(x_1, y_1)$, $(x_2, y_1)$ with mass flow values of $K_{11}$ and $K_{21}$, respectively.

The mass flow J at the current operating point 810 is calculated as the sum of a mass flow $K_{11}$ of a first predetermined operating point 801 and the difference between the mass flows at the first and second operating predetermined operating points 801, 802 $(K_{21}-K_{11})$ scaled by the ratio of the difference between the speeds at the current operating point 810 and the first predetermined operating point 801 $(x-x_1)$ and the difference between the speeds at the second predetermined operating point 802 and the first predetermined operating point 801 $(x_2-x_1)$. Thus, J is determined as:

$$J = K_{11} + \frac{(x-x_1)}{(x_2-x_1)} *(K_{21} - K_{11}) \quad (7)$$

In other embodiments, J may also be may be calculated from any other predetermined points using similar calculations.

Figure 9:
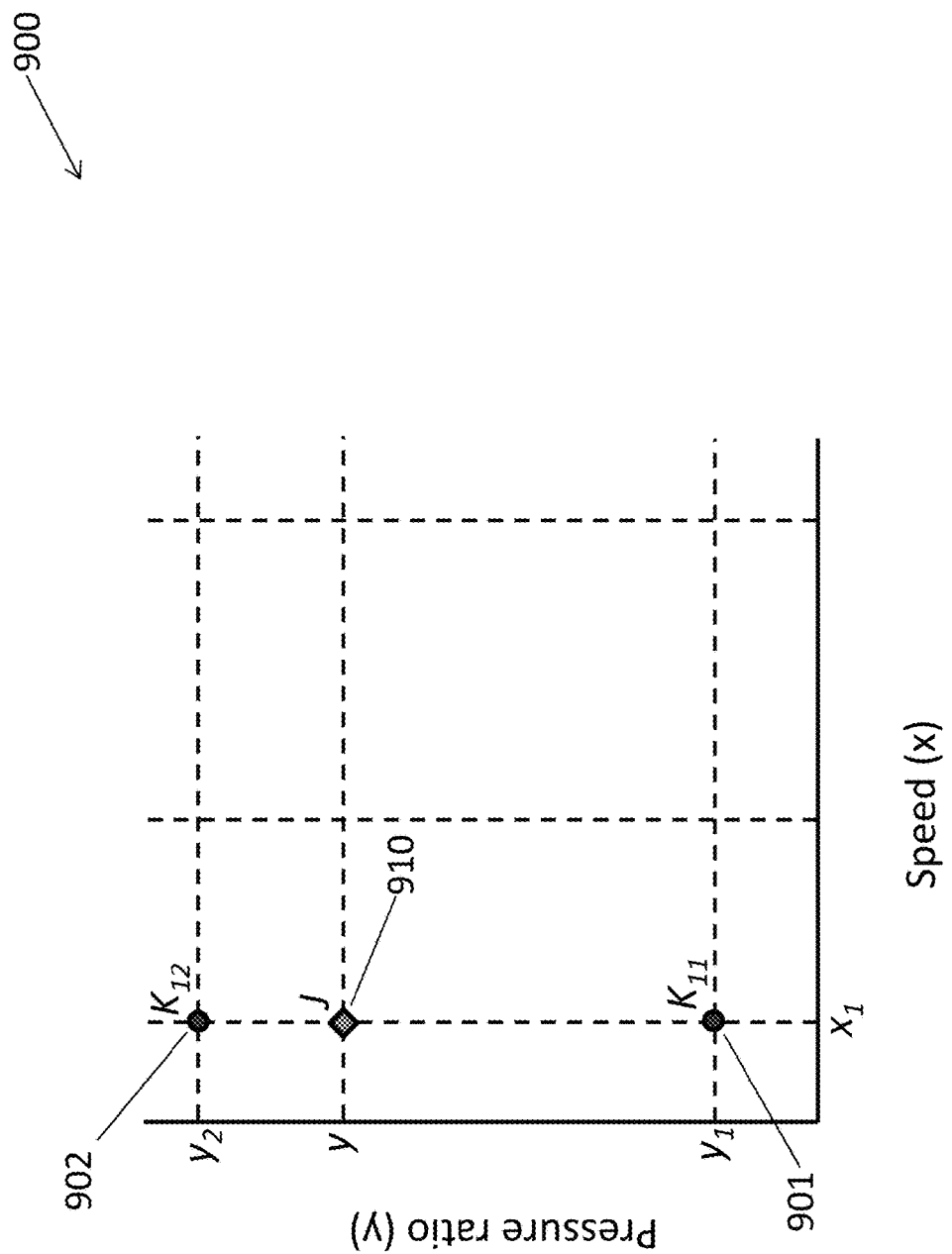
FIG. 9 is a fourth graphical representation of a current operating point and a subset of the nearest predetermined operating points.

FIG. 9 shows a fourth graphical representation of a current operating point 910 and a subset 900 of the predetermined operating points nearest the current operating point 910. The current operating point 910 has the same speed value $x_1$ as the two nearest predetermined operating points 901, 902 but a different pressure ratio value y, and it is not adjacent to the surge line 520 or the choke line 530. Thus, the subset of nearest points 900 is formed from the two nearest points having the same speed value, for example, those shown at coordinates $(x_1, y_1)$, $(x_1, y_2)$ with mass flow values of $K_{11}$ and $K_{12}$, respectively.

The mass flow J at the current operating point 910 is calculated as the sum of a mass flow $K_{11}$ of a first predetermined operating point 901 and the difference between the mass flows at the first and second predetermined operating points 902, 901 $(K_{12}-K_{11})$ scaled by the ratio of the difference between the pressure ratios at the current operating point 910 and the first predetermined operating point 901 $(y-y_1)$ and the difference between the pressure ratios at the second predetermined operating point 902 and the first predetermined operating point 901 $(y_2-y_1)$. Thus, J is determined as:

$$J = K_{11} + \frac{(y - y_1)}{(y_2 - y_1)} * (K_{12} - K_{11}) \tag{8}$$

In other embodiments, J may also be determined may be calculated from any other predetermined points using similar calculations.

Figure 10:
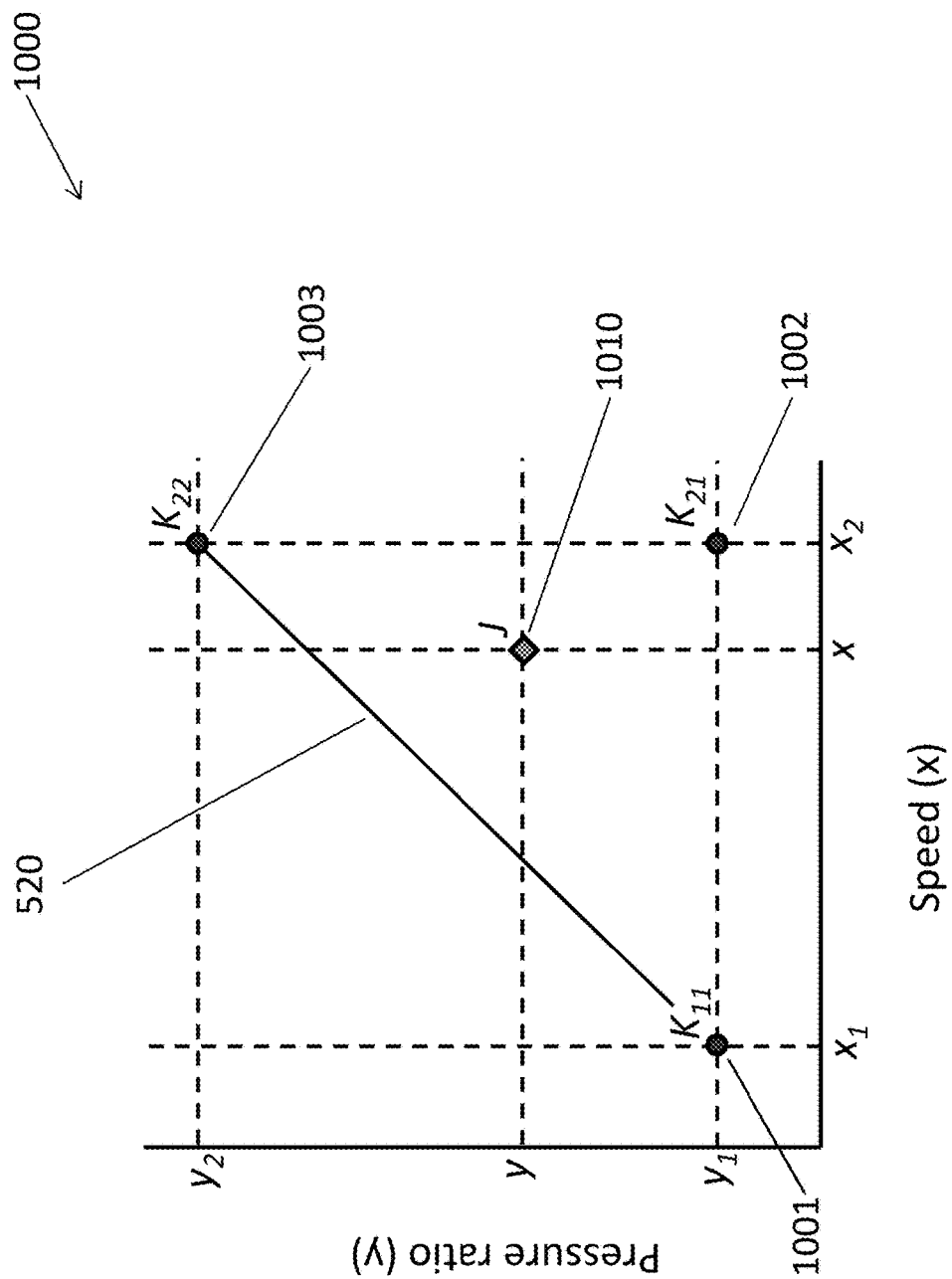
FIG. 10 is a fifth graphical representation of a current operating point and a subset of the nearest predetermined operating points.

FIG. 10 shows a fifth graphical representation of a current operating point 1010 and a subset 1000 of the predetermined operating points nearest the current operating point 1010. Because the current operating point 1010 is adjacent the surge line 520, and the map of predetermined operating points is not defined above the surge line 520, the subset of nearest points 1000 is formed with the three predetermined operating points 1001, 1002, 1003 that are closest to the current operating point 1010. In this example, the subset 1000 includes the points shown at coordinates $(x_1, y_1)$, $(x_2, y_1)$, and $(x_2, y_2)$ with mass flow values $K_{11}$, $K_{21}$, and $K_{22}$, respectively.

The mass flow at the current operating point 1010 can be determined by computing the contribution of the known mass flows $K_{11}$, $K_{21}$, and $K_{22}$ at each of the predetermined operating points 1001, 1002, 1003 to the current operating point 1010 based on their distance from the current operating point 1010. Weighting factors $W_{K11}$, $W_{K21}$, $W_{K22}$ are defined for the mass flow $K_{11}$, $K_{21}$, $K_{22}$ at each predetermined operating point 1001, 1002, 1003 that satisfy the following three equations:

$$x = W_{K_{11}}x_{K_{11}} + W_{K_{21}}x_{K_{21}} + W_{K_{22}}x_{K_{22}} \tag{9}$$

$$y = W_{K_{11}}y_{K_{11}} + W_{K_{21}}y_{K_{21}} + W_{K_{22}}y_{K_{22}} \tag{10}$$

$$W_{K_{11}} + W_{K_{21}} + W_{K_{22}} = 1 \tag{11}$$

The values $x_{K11}$, $x_{K21}$, and $x_{K22}$ represent the x-coordinate of each predetermined operating point, and the values $y_{K11}$, $y_{K21}$, and $y_{K22}$ represent the y-coordinate of each predetermined operating point. The coordinates $(x_1, y_1)$, $(x_2, y_1)$, $(x_2, y_2)$ of each predetermined operating points 1001, 1002, 1003 are substituted into equations 9 and 10. The system of equations can then be simplified and solved for each weighting factor. Thus, the weighting factors $W_{K11}$, $W_{K21}$, $W_{K22}$ are determined as:

$$W_{K_{11}} = \frac{x - x_2}{x_1 - x_2} \tag{12}$$

$$W_{K_{21}} = \frac{x_2 - x}{x_1 - x_2} + \frac{y - y_2}{y_1 - y_2} \tag{13}$$

$$W_{K_{22}} = 1 - W_{K_{11}} - W_{K_{21}} \tag{14}$$

Finally, the mass flow J at the current operating point 1010 can be calculated as the sum of the mass flows at each of the predetermined operating points scaled by their respective weighting factor $W_{K11}$, $W_{K21}$, $W_{K22}$. Thus, J is determined as:

$$J = W_{Q_{11}}K_{11}W_{Q_{21}}K_{21}W_{Q_{22}}K_{22} \tag{15}$$

Figure 11:
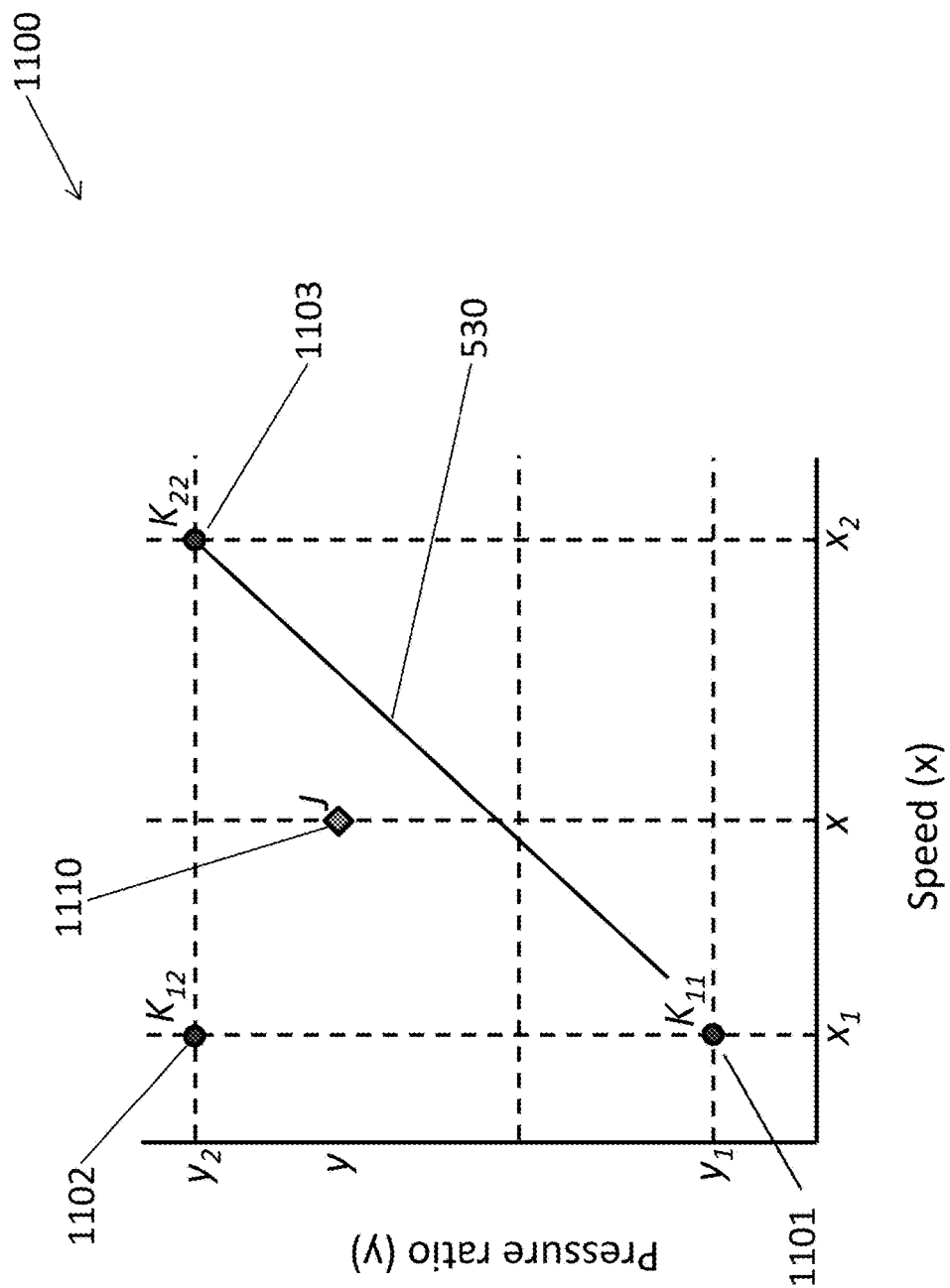
FIG. 11 is a sixth graphical representation of a current operating point and a subset of the nearest predetermined operating points.

FIG. 11 shows a sixth graphical representation of a current operating point 1110 and a subset 1100 of the predetermined operating points nearest the current operating point 1110. Since the current operating point 1110 is adjacent the choke line 530, and the map of predetermined operating points is not defined below the choke line 530, the subset of nearest points 1100 is formed with the three predetermined operating points 1101, 1102, 1103 that are closest to the current operating point 1110. In this example, the subset 1100 includes the points shown at coordinates $(x_1, y_1)$, $(x_1, y_2)$, and $(x_2, y_2)$ with mass flow values $K_{11}$, $K_{12}$, and $K_{22}$, respectively.

Similarly to the procedure described for FIG. 10 above, the mass flow at current operating point 1110 can be determined by computing the contribution of the known mass flows $K_{11}$, $K_{12}$, and $K_{22}$ at each of the predetermined operating points 1101, 1102, 1103 to the current operating point 1110 based on their distance from the current operating point 1110. Weighting factors $W_{K11}$, $W_{K12}$, $W_{K22}$ are defined for the mass flow $K_{11}$, $K_{12}$, $K_{22}$ at each predetermined operating point 1101, 1102, 1103 that satisfy the following three equations:

$$x = W_{K_{11}}x_{K_{11}} + W_{K_{12}}x_{K_{12}} + W_{K_{22}}x_{K_{22}} \tag{16}$$

$$y = W_{K_{11}}y_{K_{11}} + W_{K_{12}}y_{K_{12}} + W_{K_{22}}y_{K_{22}} \tag{17}$$

$$W_{K_{11}} + W_{K_{12}} + W_{K_{22}} = 1 \tag{18}$$

The values $x_{K11}$, $x_{K12}$, and $x_{K22}$ represent the x-coordinate of each predetermined operating point, and the values $y_{K11}$, $y_{K12}$, and $y_{K22}$ represent the y-coordinate of each predetermined operating point. The coordinates $(x_1, y_1)$, $(x_1, y_2)$, and $(x_2, y_2)$ of the three predetermined points 1101, 1102, 1103 are substituted into equations 16 and 17. The system of equations can then be simplified and solved for each weighting factor. Thus, the weighting factors $W_{K11}$, $W_{K12}$, $W_{K22}$ are determined as:

$$W_{K_{11}} = \frac{y - y_2}{y_1 - y_2} \tag{19}$$

$$W_{K_{12}} = \frac{x_2 - x}{x_2 - x_1} + \frac{y_2 - y}{y_1 - y_2} \tag{20}$$

$$W_{K_{22}} = 1 - W_{K_{11}} - W_{K_{12}} \tag{21}$$

Finally, the mass flow J at the current operating point 1110 can be calculated by summing the mass flows at each of the predetermined operating points 1101, 1102, 1103 scaled by their respective weighting factor $W_{K11}$, $W_{K12}$, $W_{K22}$. Thus, J is determined as:

$$P = W_{K_{11}}K_{11} + W_{K_{12}}K_{12} + W_{K_{22}}K_{22} \tag{22}$$

In all of the cases described in FIG. 7A-11, the current operating point is at the same VIGV position as its corresponding subset of predetermined operating points. If the current operating point does not have the same VIGV position value as any of the predetermined operating points, a modified procedure can be followed, which is described in detail below.

Figure 12:
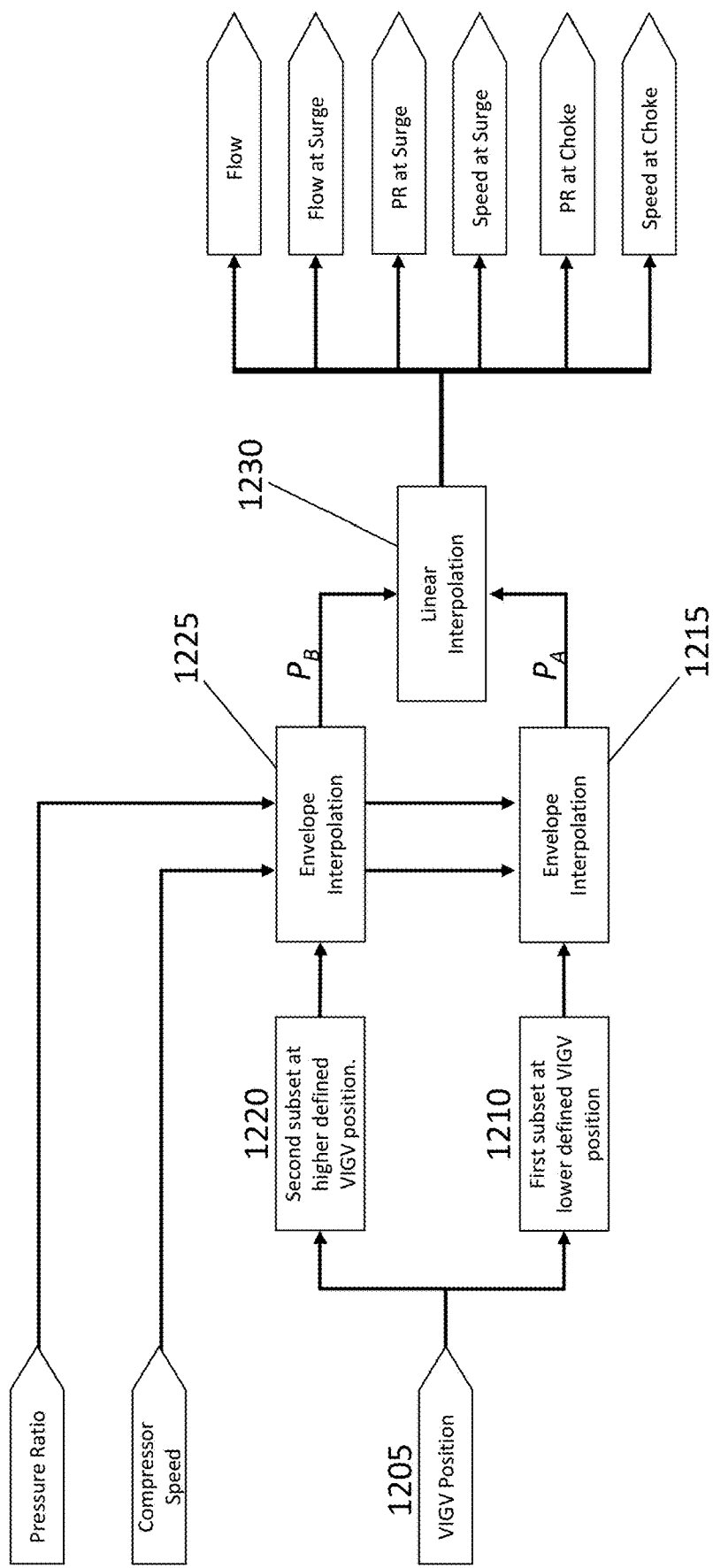
FIG. 12 is a flow chart of a method of calculating the inlet mass flow rate at the current operating point using two subsets of predetermined operating points at a first and second VIGV position.

FIG. 12 is a flow chart of a method of determining the mass flow at the current operating point when the current operating point does not have the same VIGV position value as any of the predetermined operating points. A first subset 1210 of predetermined operating points is determined from a map of predetermined operating points at a first VIGV position less than the VIGV position 1205 of the current operating point. The subset comprises the predetermined operating points with the closest values of speed and pressure ratio to those of the current operating point. The processor 311 follows the relevant interpolation procedure 1215 described above to calculate a first intermediate mass flow $J_A$, which represents the mass flow at an operating point at the same speed and pressure ratio as the current operating point, but at a lower VIGV position.

Similarly, a second subset 1220 of predetermined operating points is determined from a map of predetermined operating points at a second VIGV position greater than the VIGV position 1205 of the current operating point. The subset comprises the predetermined operating points with the closest values of speed and pressure ratio to those of the current operating point. The processor 311 follows the relevant interpolation procedure 1225 described above to calculate a second intermediate mass flow $J_B$, which represents the mass flow at an operating point at the same speed and pressure ratio as the current operating point, but at a higher VIGV position.

Figure 13:
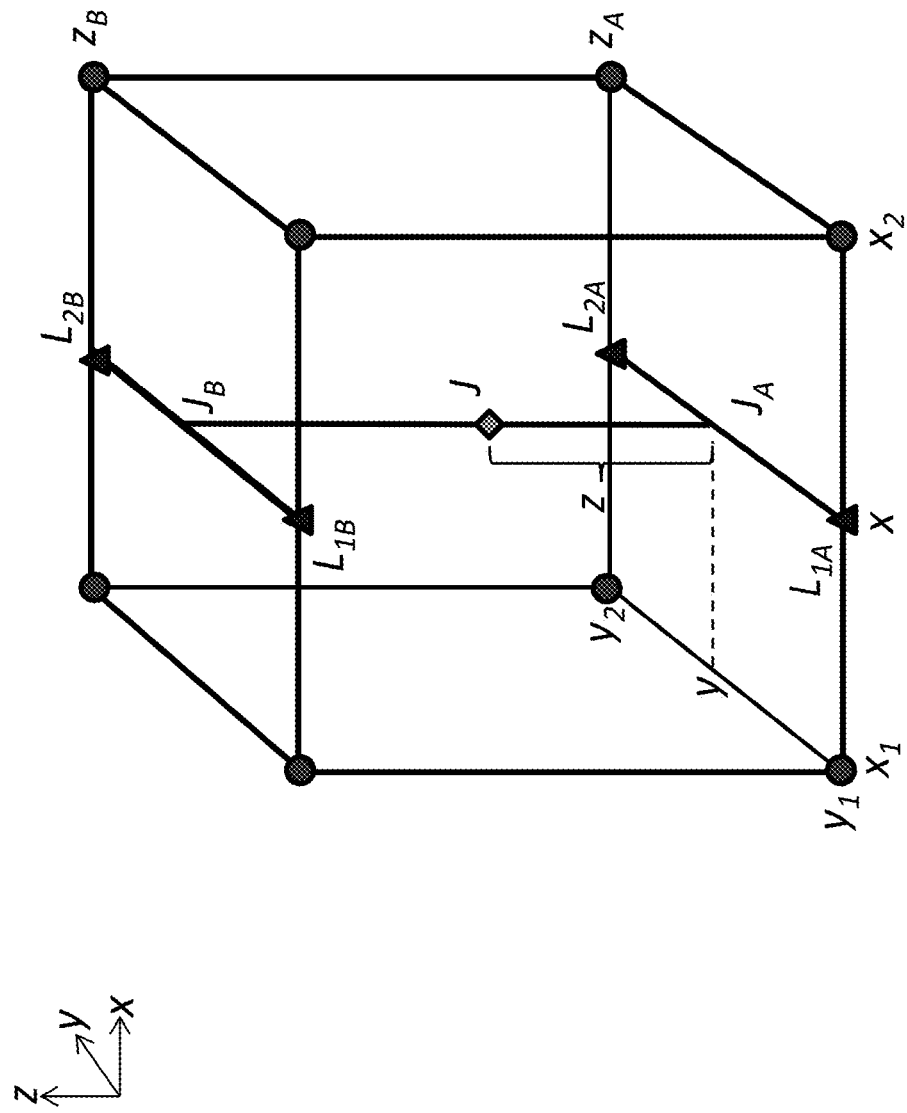
FIG. 13 is a graphical representation of a current operating point, two intermediate mass flows, and two subsets of predetermined operating points.

Finally, the processor performs a linear interpolation 1230 to calculate the mass flow of the current operating point as a function of the first intermediate mass flow, the second intermediate mass flow, and the calculated distances between the current VIGV position, the first VIGV position, and the second VIGV position. Referring to FIG. 13, the mass flow J is calculated as the sum of the first intermediate mass flow $J_A$ and the difference between the second and first intermediate mass flows ($J_B-J_A$) scaled by the ratio of the difference between the current VIGV position and the first VIGV position ($z-z_A$) and the difference between the second VIGV position and first VIGV position ($z_B-z_A$). Thus, the mass flow J is determined as:

$$J = J_A + \frac{(z-z_A)}{(z_B-z_A)} * (J_B - J_A) \qquad (23)$$

Figure 14:
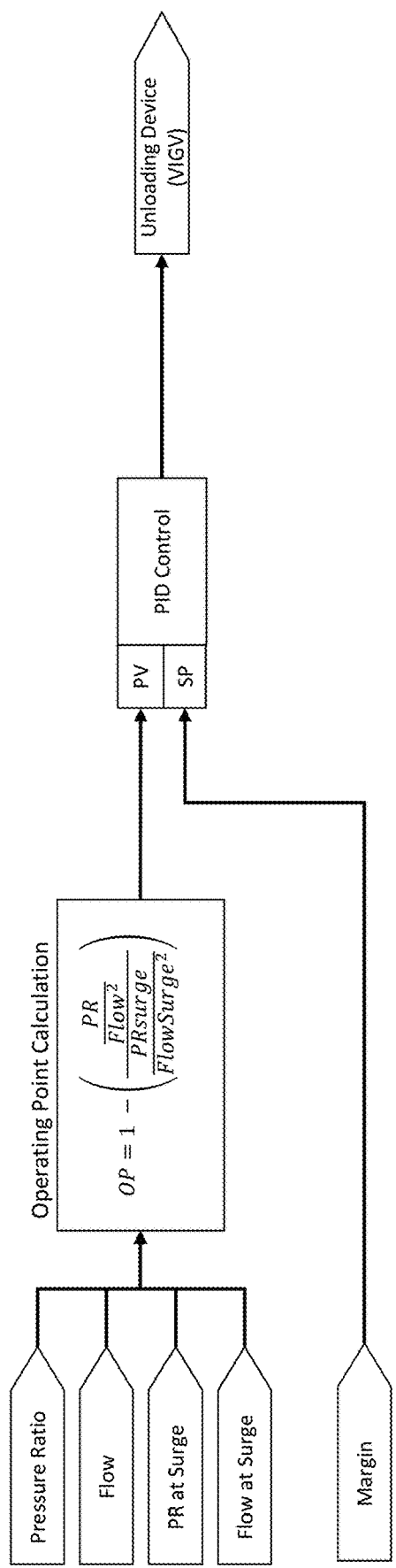
FIG. 14 is a flow chart of an example control algorithm for operation of a dynamic compressor using inlet mass flow rate as an input.

In other embodiments, J may be determined starting from $J_B$ using similar calculations The processor 311 may use the calculated inlet mass flow rate K of the current operating point as an input for a control algorithm for operation of the dynamic compressor 304, an embodiment of which is shown in FIG. 14. In other embodiments, the calculated inlet mass flow may be used in any other control algorithm that uses inlet mass flow as a parameter.

The methods described above may also be used to calculate the mass flow and pressure ratio at a surge point that corresponds to the current operating point; that is, the point at which the compressor would surge if it maintained the same speed but not the same pressure ratio as the current operating point. The methods described above may additionally or alternatively be used to calculate the mass flow and pressure ratio at a choke point that corresponds to the current operating point; that is, the point at which the compressor would experience choked flow if it maintained the same speed but not the same pressure ratio as the current operating point. Thus, in some embodiments, the system calculates the inlet mass flow at the current operating point, and one or more of the inlet mass flow and pressure ratio at surge for the current operating point, and the inlet mass flow and pressure ratio at a choke point for the current operating point.

Technical benefits of the methods and systems described herein are as follows: (a) obtaining real-time mass flow data without the expense of mass flow instrumentation and (b) providing inputs for active control of an unloading device, such as a VIGV, to prevent compressor surge When introducing elements of the present disclosure or the embodiment(s) thereof, the articles "a", "an", "the" and "said" are intended to mean that there are one or more of the elements. The terms "comprising," "including," "containing" and "having" are intended to be inclusive and mean that there may be additional elements other than the listed elements. The use of terms indicating a particular orientation (e.g., "top", "bottom", "side", etc.) is for convenience of description and does not require any particular orientation of the item described.

As various changes could be made in the above constructions and methods without departing from the scope of the disclosure, it is intended that all matter contained in the above description and shown in the accompanying drawing (s) shall be interpreted as illustrative and not in a limiting sense.

What is claimed is:

1. A system comprising:
   a dynamic compressor operable to compress a working fluid, the dynamic compressor comprising an impeller, a motor operably connected to the impeller, a variable frequency drive (VFD) coupled to the motor, and a variable inlet guide vane (VIGV); and
   a controller connected to the dynamic compressor, the controller comprising a processor and a memory, the memory storing:
      a map of a plurality of predetermined operating points of the dynamic compressor, each predetermined operating point including a mass flow of the dynamic compressor at that predetermined operating point; and
      instructions that program the processor to:
         operate the dynamic compressor to compress the working fluid by controlling a position of the VIGV and controlling a speed of the motor driving the impeller using the VFD;
         determine, while operating the dynamic compressor, a current operating point of the compressor;
         calculate a mass flow for the current operating point from the map of the plurality of predetermined operating points; and
         continue to operate the dynamic compressor to compress the working fluid based at least in part on the calculated mass flow for the current operating point by inputting the calculated mass flow into a control algorithm that calculates an operating point value based at least in part on the calculated mass flow and controlling an unloading device of the dynamic compressor based on the operating point value and a margin.

2. The system of claim 1, wherein the instructions stored in the memory program the processor to calculate the mass flow for the current operating point from the map of the plurality of predetermined operating points by:
retrieving the mass flow from the map when the current operating point is one of the predetermined operating points; and
determining the mass flow for the current operating point by interpolating between a plurality of the predetermined operating points when the current operating point is not one of the predetermined operating points.

3. The system of claim 1, wherein the instructions stored in the memory program the processor to calculate the mass flow for the current operating point from the map of the plurality of predetermined operating points by:
identifying a subset of the predetermined operating points;
determining distances between the current operating point and each predetermined operating point in the subset of the predetermined operating points; and
calculating the mass flow of the current operating point as a function of the determined distances and the mass flow of each predetermined operating point in the subset of the predetermined operating points.

4. The system of claim 1, wherein each predetermined operating point and the current operating point are defined by the speed of the motor and an operating pressure ratio of the compressor.

5. The system of claim 1, wherein each predetermined operating point and the current operating point are defined by the speed of the motor, an operating pressure ratio, and the position of the VIGV.

6. The system of claim 5, wherein the instructions stored in the memory program the processor to calculate the mass flow for the current operating point from the map of the plurality of predetermined operating points by:
identifying a first subset of the predetermined operating points, the first subset of predetermined operating points having a same first VIGV position that is less than a current VIGV position of the current operating point;
determining distances between the current operating point with the current VIGV position replaced with the first VIGV position and the predetermined operating points in the first subset;
calculating a first intermediate mass flow of the current operating point with the current VIGV position replaced with the first VIGV position as a function of the determined distances and the mass flow of each predetermined operating point of the first subset;
identifying a second subset of the predetermined operating points, the second subset of predetermined operating points having a same second VIGV position greater than the current VIGV position of the current operating point;
determining distances between the current operating point with the current VIGV position replaced with the second VIGV position and the predetermined operating points of the second subset;
calculating a second intermediate mass flow of the current operating point with the current VIGV position replaced with the second VIGV position as a function of the determined distances and the mass flow of each predetermined operating point of the second subset; and
calculating the mass flow of the current operating point as a function of the first intermediate mass flow, the second intermediate mass flow, and distances between the current VIGV position and the first and second VIGV positions.

7. The system of claim 1, wherein the memory further stores a map of a plurality of predetermined surge points, a surge point mass flow for each predetermined surge point, a map of a plurality of predetermined choke points, and a choke point mass flow for each predetermined choke point, and the instructions stored in the memory program the processor to:
determine a current surge point for the current operating point based on the map of the plurality of predetermined surge points;
determine a current choke point for the current operating point based on the map of the plurality of predetermined choke points;
calculate a surge point mass flow for the current surge point from the map of the plurality of predetermined surge points; and
calculate a choke point mass flow for the current choke point from the map of the plurality of predetermined choke points.

8. The system of claim 1, wherein the dynamic compressor does not include a mass flow sensor.

9. A controller for a dynamic compressor without a mass flow sensor, the dynamic compressor including an impeller, a motor operably connected to the impeller, a variable frequency drive (VFD) coupled to the motor, and a variable inlet guide vane (VIGV), the controller comprising:
a processor; and
a memory, the memory storing:
a map of a plurality of predetermined operating points of the dynamic compressor, each predetermined operating point including a mass flow of the dynamic compressor at that predetermined operating point; and
instructions that program the processor to:
operate the dynamic compressor to compress the working fluid by controlling a position of the VIGV and controlling a speed of the motor driving the impeller using the VFD;
determine, while operating the dynamic compressor, a current operating point of the compressor;
calculate a mass flow for the current operating point from the map of the plurality of predetermined operating points; and
continue to operate the dynamic compressor to compress the working fluid based at least in part on the calculated mass flow for the current operating point by inputting the calculated mass flow into a control algorithm that calculates an operating point value based at least in part on the calculated mass flow and controlling an unloading device of the dynamic compressor based on the operating point value and a margin.

10. The controller of claim 9, wherein the instructions stored in the memory program the processor to calculate the mass flow for the current operating point from the map of the plurality of predetermined operating points by:
retrieving the mass flow from the map when the current operating point is one of the predetermined operating points; and
determining the mass flow for the current operating point by interpolating between a plurality of the predetermined operating points when the current operating point is not one of the predetermined operating points.

11. The controller of claim 10, wherein each predetermined operating point and the current operating point are defined by the speed of the motor, an operating pressure ratio, and the position of the VIGV, wherein the instructions stored in the memory program the processor to calculate the mass flow for the current operating point from the map of the plurality of predetermined operating points by:
  identifying a first subset of the predetermined operating points, the first subset of predetermined operating points having a same first VIGV position that is less than a current VIGV position of the current operating point;
  determining distances between the current operating point with the current VIGV position replaced with the first VIGV position and the predetermined operating points in the first subset;
  calculating a first intermediate mass flow of the current operating point with the current VIGV position replaced with the first VIGV position as a function of the determined distances and the mass flow of each predetermined operating point of the first subset;
  identifying a second subset of the predetermined operating points, the second subset of predetermined operating points having a same second VIGV position greater than the current VIGV position of the current operating point;
  determining distances between the current operating point with the current VIGV position replaced with the second VIGV position and the predetermined operating points of the second subset;
  calculating a second intermediate mass flow of the current operating point with the current VIGV position replaced with the second VIGV position as a function of the determined distances and the mass flow of each predetermined operating point of the second subset; and
  calculating the mass flow of the current operating point as a function of the first intermediate mass flow, the second intermediate mass flow, and distances between the current VIGV position and the first and second VIGV positions.

12. The controller of claim 9, wherein the instructions stored in the memory program the processor to calculate the mass flow for the current operating point from the map of the plurality of predetermined operating points by:
  identifying a subset of the predetermined operating points;
  determining distances between the current operating point and each predetermined operating point in the subset of the predetermined operating points; and
  calculating the mass flow of the current operating point as a function of the determined distances and the mass flow of each predetermined operating point in the subset of the predetermined operating points.

13. The controller of claim 9, wherein each predetermined operating point and the current operating point are defined by the speed of the motor and an operating pressure ratio.

14. The controller of claim 9, wherein the memory further stores a map of a plurality of predetermined surge points, a surge point mass flow for each predetermined surge point, a map of a plurality of predetermined choke points, and a choke point mass flow for each predetermined choke point, and the instructions stored in the memory program the processor to:
  determine a current surge point for the current operating point based on the map of the plurality of predetermined surge points;
  determine a current choke point for the current operating point based on the map of the plurality of predetermined choke points;
  calculate a surge point mass flow for the current surge point from the map of the plurality of predetermined surge points; and
  calculate a choke point mass flow for the current choke point from the map of the plurality of predetermined choke points.

15. A method of determining a mass flow of a dynamic compressor that is compressing a working fluid and does not include a mass flow sensor, the dynamic compressor including an impeller, a motor operably connected to the impeller, a variable frequency drive (VFD) coupled to the motor, and a variable inlet guide vane (VIGV), the method comprising:
  operating the dynamic compressor to compress the working fluid by controlling a position of the VIGV and controlling a speed of the motor driving the impeller using the VFD;
  determining, while operating the dynamic compressor, a current operating point of the compressor;
  calculating the mass flow for the current operating point from a map of a plurality of predetermined operating points, each predetermined operating point including a mass flow of the dynamic compressor at that predetermined operating point; and
  continuing to operate the dynamic compressor to compress the working fluid based at least in part on the calculated mass flow for the current operating point by inputting the calculated mass flow into a control algorithm that calculates an operating point value based at least in part on the calculated mass flow and controlling an unloading device of the dynamic compressor based on the operating point value and a margin.

16. The method of claim 15, wherein calculating the mass flow for the current operating point from the map of the plurality of predetermined operating points comprises:
  identifying a subset of the predetermined operating points;
  determining distances between the current operating point and each predetermined operating point in the subset of the predetermined operating points; and
  calculating the mass flow of the current operating point as a function of the determined distances and the mass flow of each predetermined operating point in the subset of the predetermined operating points.

17. The method of claim 15, wherein each predetermined operating point and the current operating point are defined by the speed of the motor, an operating pressure ratio, and the position of the VIGV, and calculating the mass flow for the current operating point from the map of the plurality of predetermined operating points comprises:
  identifying a first subset of the predetermined operating points, the first subset of predetermined operating points having a same first VIGV position that is less than a current VIGV position of the current operating point;
  determining distances between the current operating point with the current VIGV position replaced with the first VIGV position and the predetermined operating points in the first subset;
  calculating a first intermediate mass flow of the current operating point with the current VIGV position replaced with the first VIGV position as a function of the determined distances and the mass flow of each predetermined operating point of the first subset;

identifying a second subset of the predetermined operating points, the second subset of predetermined operating points having a same second VIGV position greater than the current VIGV position of the current operating point;

determining distances between the current operating point with the current VIGV position replaced with the second VIGV position and the predetermined operating points of the second subset;

calculating a second intermediate mass flow of the current operating point with the current VIGV position replaced with the second VIGV position as a function of the determined distances and the mass flow of each predetermined operating point of the second subset; and calculating the mass flow of the current operating point as a function of the first intermediate mass flow, the second intermediate mass flow, and distances between the current VIGV position and the first and second VIGV positions.

18. The method of claim 15, further comprising determining a current surge point for the current operating point based on a map of a plurality of predetermined surge points, wherein the map includes a surge point mass flow for each predetermined surge point;

determining a current choke point for the current operating point based on a map of the plurality of predetermined choke points, wherein the map includes a choke point mass flow for each predetermined choke point;

calculating a surge point mass flow for the current surge point from the map of the plurality of predetermined surge points; and calculating a choke point mass flow for the current choke point from the map of the plurality of predetermined choke points.

* * * * *